US 12,404,104 B2

(12) United States Patent
Hart et al.

(10) Patent No.: US 12,404,104 B2
(45) Date of Patent: *Sep. 2, 2025

(54) MODULAR VERTICAL LIFT SYSTEM

(71) Applicant: INTELLIGRATED HEADQUARTERS, LLC, Mason, OH (US)

(72) Inventors: Benjamin Hart, Cincinnati, OH (US); Thomas Kramer, Covington, KY (US); Jarl Nicholas Sebastian, Trenton, OH (US); Joshua Jackiewiecz, Oxford, OH (US); Anthony Turco, Liberty Township, OH (US); Ang Li, Centerville, OH (US); Justen Pahls, Hamilton, OH (US)

(73) Assignee: INTELLIGRATED HEADQUARTERS, LLC, Mason, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/343,156

(22) Filed: Jun. 28, 2023

(65) Prior Publication Data

US 2023/0339682 A1    Oct. 26, 2023

Related U.S. Application Data

(63) Continuation of application No. 17/368,139, filed on Jul. 6, 2021, now Pat. No. 11,724,878.

(51) Int. Cl.
*B65G 1/06* (2006.01)
*B65G 1/04* (2006.01)

(52) U.S. Cl.
CPC .............. *B65G 1/06* (2013.01); *B65G 1/0492* (2013.01); *B65G 2203/0233* (2013.01)

(58) Field of Classification Search
CPC . B65G 1/06; B65G 1/0492; B65G 2203/0233
See application file for complete search history.

(56) References Cited

U.S. PATENT DOCUMENTS

| 4,285,557 A | 8/1981 | Paladino et al. |
| 5,333,982 A | 8/1994 | Tanizawa et al. |

(Continued)

FOREIGN PATENT DOCUMENTS

| CN | 104210793 B | 10/2016 |
| EP | 2008950 A1 | 12/2008 |

(Continued)

OTHER PUBLICATIONS

Examiner Interview Summary Record (PTOL-413) Mailed on May 15, 2023 for U.S. Appl. No. 17/368,139, 1 page(s).

(Continued)

*Primary Examiner* — Saul Rodriguez
*Assistant Examiner* — Willie W Berry, Jr.
(74) *Attorney, Agent, or Firm* — ALSTON & BIRD LLP

(57) ABSTRACT

A conveyor carriage movable on a guide rail. The conveyor carriage includes a conveyor frame; a pair of side rails spaced apart from each other; and a load carrying portion coupled to the pair of side rails. A drop-down plate hingedly mounted to the conveyor frame and positioned in between the pair of side rails. The drop-down plate is pivotable between an open position and a closed position, wherein the drop-down plate encloses a component of the conveyor carriage in the closed position. The conveyor carriage to pick up and deposit loads from and to a load handling station. The load handling station including a control box with a pivotable lid to enclose one or more components of the load handling station in the closed position.

20 Claims, 9 Drawing Sheets

(56) References Cited

U.S. PATENT DOCUMENTS

| | | |
|---|---|---|
| 10,239,696 B1 | 3/2019 | Brouk |
| 10,611,568 B2 | 4/2020 | Schack et al. |
| 10,669,102 B2 | 6/2020 | McIntire et al. |
| 11,040,829 B2 | 6/2021 | Skanse |
| 2007/0032903 A1 | 2/2007 | Tsujimoto |
| 2013/0129453 A1 | 5/2013 | Salichs et al. |
| 2016/0214808 A1 | 7/2016 | Cyrulik et al. |
| 2017/0008701 A1 | 1/2017 | Terrill et al. |
| 2017/0101264 A1 | 4/2017 | Brumm et al. |
| 2017/0253430 A1 | 9/2017 | Buzan et al. |
| 2019/0127147 A1* | 5/2019 | Wagner .................. B65G 67/02 |
| 2020/0071074 A1 | 3/2020 | Hart et al. |
| 2021/0047112 A1 | 2/2021 | Stevens et al. |

FOREIGN PATENT DOCUMENTS

| | | |
|---|---|---|
| JP | 2015-157683 A | 9/2015 |
| WO | 2021/019383 A1 | 2/2021 |

OTHER PUBLICATIONS

Extended European search report and search opinion Mailed on Dec. 2, 2022 for EP Application No. 22179825, 14 pages(s).

Final Rejection Mailed on Jan. 10, 2023 for U.S. Appl. No. 17/368,139, 8 page(s).

Non-Final Office Action Mailed on Jul. 12, 2022 for U.S. Appl. No. 17/368,139, 8 page(s).

Notice of Allowance and Fees Due (PTOL-85) Mailed on Mar. 31, 2023 for U.S. Appl. No. 17/368,139, 5 page(s).

Notice of Allowance and Fees Due (PTOL-85) Mailed on May 15, 2023 for U.S. Appl. No. 17/368,139, 4 page(s).

U.S. Appl. No. 17/368,139, filed Jul. 6, 2021, U.S. Pat. No. 11,724,878, Patented.

Communication about intention to grant a European patent Mailed on Jun. 21, 2024 for EP Application No. 22179825, 6 page(s).

Decision to grant a European patent Mailed on Oct. 31, 2024 for EP Application No. 22179825, 2 page(s).

Extended European Search Report Mailed on Dec. 13, 2024 for EP Application No. 24196628, 10 page(s).

* cited by examiner

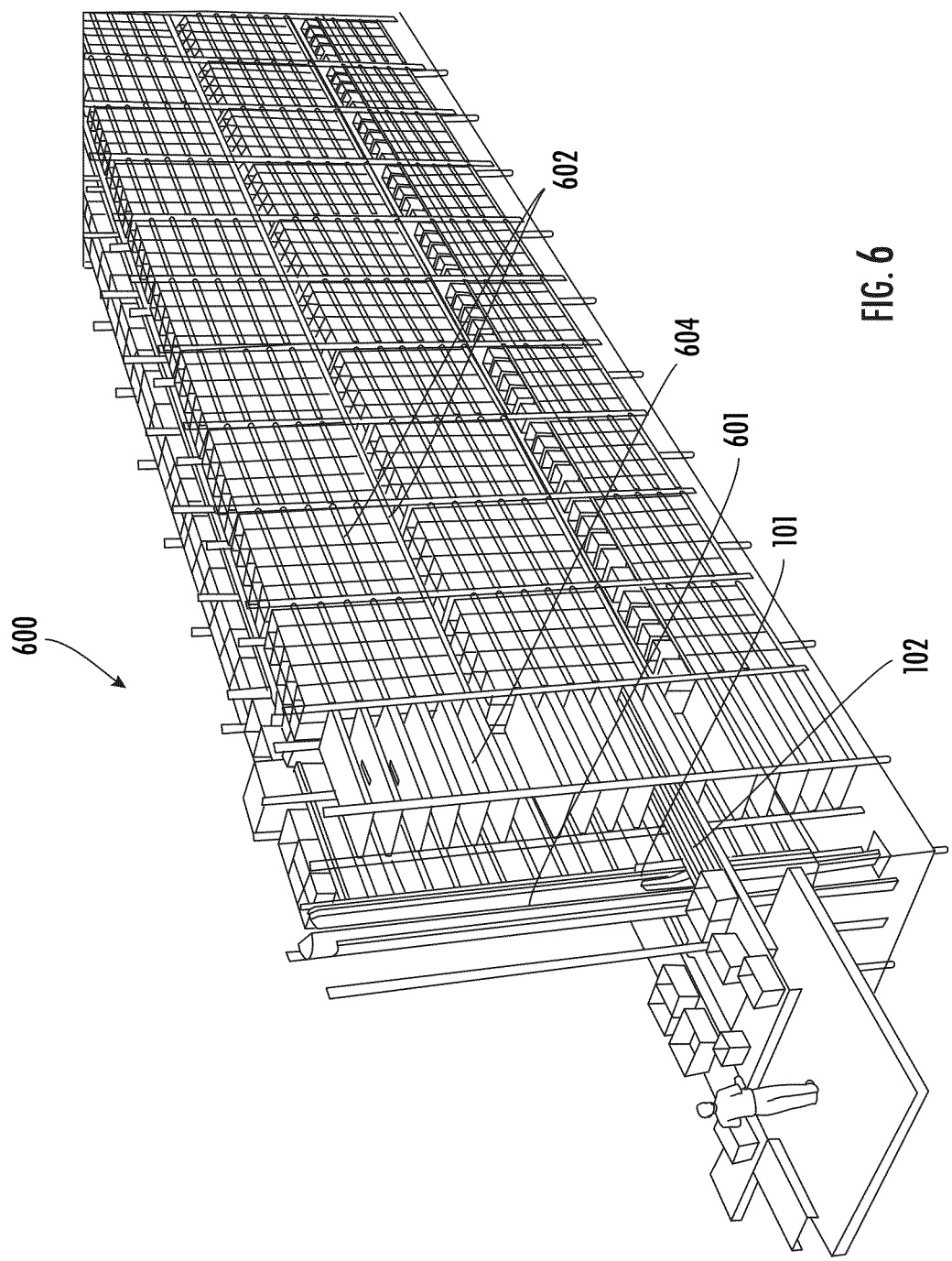

MODULAR VERTICAL LIFT SYSTEM

CROSS-REFERENCE TO RELATED APPLICATIONS

This application is a continuation of and claims priority to U.S. Non-Provisional application Ser. No. 17/368,139, filed Jul. 6, 2021, the contents of which are incorporated herein by reference in its entirety.

TECHNOLOGICAL FIELD

Example embodiments of the present disclosure relate generally to a storage and retrieval system and, more particularly, to a vertical lift system used in a storage and retrieval system.

BACKGROUND

Picking loads in warehouse or distribution centers for order fulfillment can be been challenging. Different transportation systems pick loads from a source and transport them to a destination. The transportation systems may be, for example, conveying devices or transport devices. Generally, warehouses or distribution centers for storing loads may include a storage system that comprise a series of storage racks that are accessible by the transport devices such as, but not limited to, shuttles or vertical lifts or stacker cranes that are movable within aisles along the storage racks. These transport devices may be used for storing and retrieving of loads in or from a storage rack of the storage system. Generally, the transport devices are comprised of multiple components which may be positioned on a frame and outside the frame of the transport devices which works in synergy to control movement of the transport devices and the movement of the loads handled by the transport devices.

SUMMARY

The following presents a simplified summary to provide a basic understanding of some aspects of the disclosed material handling system. This summary is not an extensive overview and is intended to neither identify key or critical elements nor delineate the scope of such elements. Its purpose is to present some concepts of the described features in a simplified form as a prelude to the more detailed description that is presented later.

Various example embodiments described herein relate to a conveyor carriage movable on a guide rail. The conveyor carriage includes a conveyor frame comprising a pair of side rails spaced apart from each other; a load carrying portion coupled to the pair of side rails; and a drop-down plate hingedly mounted to the conveyor frame and positioned in between the pair of side rails. The drop-down plate is pivotable between an open position and a closed position, wherein the drop-down plate encloses a component of the conveyor carriage in the closed position.

Various example embodiments described herein relate to a conveyor carriage which includes at least one attachment bracket coupled at a bottom of the conveyor frame in between the pair of side rails beneath the load carrying portion, wherein the drop-down plate and the attachment bracket are coupled together with a hinge mechanism.

Various example embodiments described herein relate to a conveyor carriage, wherein the hinge mechanism is one of a spring-hinge or a butt-hinge.

Various example embodiments described herein relate to a conveyor carriage, wherein the component is attached on an inner surface of the drop-down plate such that the component is accessible in the open position.

Various example embodiments described herein relate to a conveyor carriage, wherein the drop-down plate further includes a locking mechanism to lock the drop-down plate with the conveyor frame in the closed position. The locking mechanism comprises spring loaded pins.

Various example embodiments described herein relate to a conveyor carriage, wherein the drop-down plate is transitioned to the open position from the closed position by retracting the spring-loaded pins.

Various example embodiments described herein relate to a conveyor carriage, wherein the load carrying portion comprises at least one of conveyor rollers or a conveyor belt or a combination thereof.

Various example embodiments described herein relate to a conveyor carriage, wherein the pair of side rails comprises a top plate attached on an upper surface of each side rail and a bottom plate attached on a bottom surface of each side rail, wherein the top plate and bottom plate extend out parallel from the side rails along a plane perpendicular to the side rails.

Various example embodiments described herein relate to a conveyor carriage, wherein the conveyor frame comprises a flared side guide attached to the top plate of each side rail.

Various example embodiments described herein relate to a conveyor carriage includes at least one sensor to detect presence of a load on the load carrying portion.

Various example embodiments described herein relate to a vertical lift including a vertical mast; a conveyor carriage; and a lifting unit to guide the conveyor carriage on the vertical mast. The conveyor carriage includes a conveyor frame comprising a pair of side rails and a load carrying portion coupled between the pair of side rails. Further, the conveyor carriage includes a pair of drop-down plates hingedly mounted to the conveyor frame and positioned in between the pair of side rails. Each drop-down plate is pivotable between an open position and a closed position, and wherein each drop-down plate encloses one or more components of the conveyor carriage in the closed position.

Various example embodiments described herein relate to a vertical lift, wherein the lifting unit includes at least one spreader to support the conveyor carriage and a set of guide rollers positioned on opposing sides of the at least one spreader, wherein the guide rollers guide the conveyor carriage on the vertical mast.

Various example embodiments described herein relate to a vertical lift, wherein each of the side rails can comprise a cut-out to facilitate mounting of the conveyor carriage on to the at least one spreader.

Various example embodiments described herein relate to a vertical lift, wherein a length of each of the drop-down plate is equal to a distance between the pair of side rails.

Various example embodiments described herein relate to a vertical lift, wherein each of the drop-down plate comprises wiring clamps mounted to an inner surface of the drop-down plate to route the wiring of the one or more components through wiring holes provided on each side rail, and wherein the wiring is housed in between a top plate and a bottom plate attached to each side rail.

Various example embodiments described herein relate to a vertical lift, wherein the drop-down plate further includes a locking mechanism to lock the drop-down plate with the conveyor frame in the closed position, wherein the locking mechanism comprises spring loaded pins.

Various example embodiments described herein relate to a rack storage system which includes a plurality of storage levels a load handling station positioned at each storage level. A control box positioned in between a guide rail and the load handling station. The control box includes a lid coupled to an end of the control box, wherein the lid is pivotable between an open position and a closed position, and wherein the lid encloses one or more components of the load handling station and bridges a gap between the guide rail and the load handling station in the closed position.

Various example embodiments described herein relate to a rack storage system, wherein the lid enables smooth transition of loads between an autonomous vehicle and the load handling station in the closed position.

Various example embodiments described herein relate to a rack storage system, wherein an end of the lid is coupled to the control box using one of hinge joints or pivot pins or mechanical fasteners.

Various example embodiments described herein relate to a rack storage system, wherein the load handling station comprises one of conveyor rollers or conveyor belts or a combination thereof to transport the loads for pick up and deposit by the autonomous vehicle.

The above summary is provided merely for purposes of summarizing some example embodiments to provide a basic understanding of some aspects of the disclosure. Accordingly, it will be appreciated that the above-described embodiments are merely examples and should not be construed to narrow the scope or spirit of the disclosure in any way. It will be appreciated that the scope of the disclosure encompasses many potential embodiments in addition to those here summarized, some of which will be further described below.

BRIEF DESCRIPTION OF THE DRAWINGS

The description of the illustrative embodiments can be read in conjunction with the accompanying figures. It will be appreciated that for simplicity and clarity of illustration, elements illustrated in the figures have not necessarily been drawn to scale. For example, the dimensions of some of the elements are exaggerated relative to other elements. Embodiments incorporating teachings of the present disclosure are shown and described with respect to the figures presented herein, in which:

FIG. 6 discloses a perspective view of a rack storage system in which the vertical lift structure of FIG. 1B is installed, in accordance with an embodiment of the present invention.

DETAILED DESCRIPTION

Figure 1A:
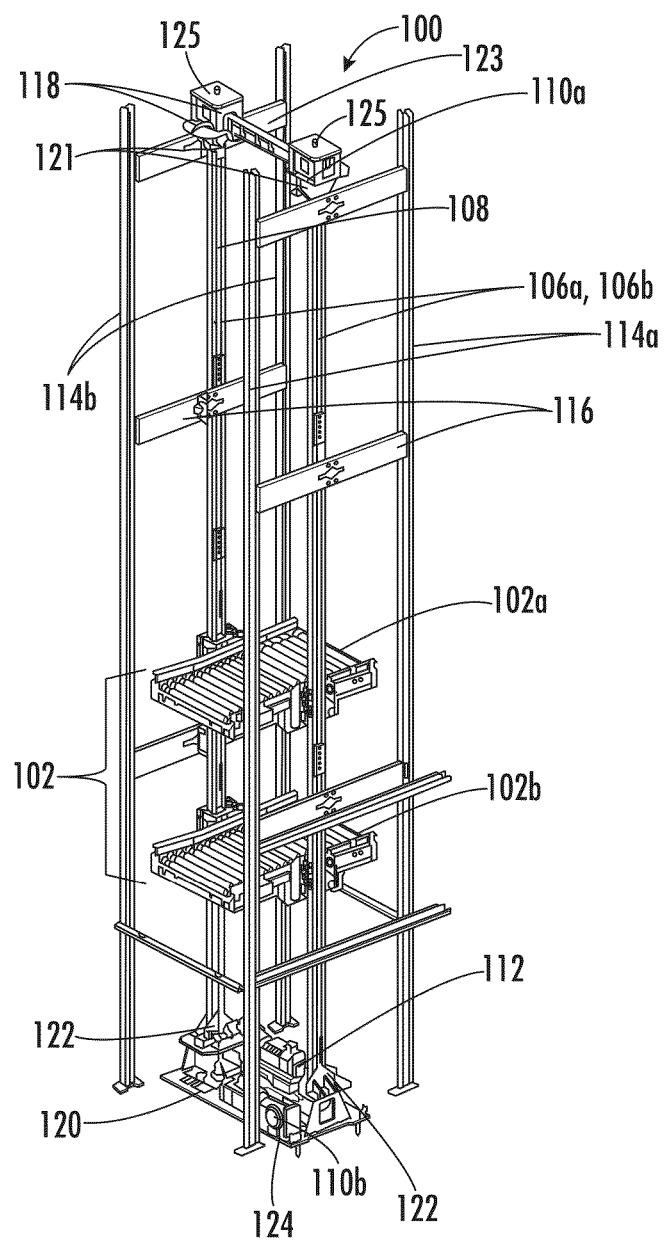
FIGS. 1A and 1B discloses a perspective view of a dual conveyor carriage on two different vertical lift structures, in accordance with an embodiment of the present invention.

Some embodiments of the present invention will now be described more fully hereinafter with reference to the accompanying drawings, in which some, but not all embodiments of the inventions are shown. Indeed, the disclosure may be embodied in many different forms and should not be construed as limited to the embodiments set forth herein; rather, these embodiments are provided so that this disclosure will satisfy applicable legal requirements. The terms "or" and "optionally" are used herein in both the alternative and conjunctive sense, unless otherwise indicated. The terms "illustrative" and "exemplary" are used to be examples with no indication of quality level. Like numbers refer to like elements throughout.

The components illustrated in the figures represent components that may or may not be present in various embodiments of the invention described herein such that embodiments may include fewer or more components than those shown in the figures while not departing from the scope of the invention.

Turning now to the drawings, the detailed description set forth below in connection with the appended drawings is intended as a description of various configurations and is not intended to represent the only configurations in which the concepts described herein may be practiced. The detailed description includes specific details for the purpose of providing a thorough understanding of various concepts with like numerals denote like components throughout the several views. However, it will be apparent to those skilled in the art that these concepts may be practiced without these specific details.

As used herein, the terms "open position" or "opened position" may be used to refer to a position in which one or more components of a conveyor carriage or a load handling station may be accessible or visible. As used herein, the terms "closed position" or "close position" may be used to refer to a position in which one or more components of the conveyor carriage or the load handling station may be fully or partially enclosed with limited or no accessibility to the one or more components. Thus, use of any such terms should not be taken to limit the spirit and scope of embodiments of the present disclosure.

As used herein, the term "gap" may be used to refer to a space created between guide tracks of the autonomous vehicle and the load handling station due to the structural arrangement of the storage racks and vertical lifts which may pose difficulty in picking or depositing loads from or to the load handling station. Thus, use of any such terms should not be taken to limit the spirit and scope of embodiments of the present disclosure.

As used herein, the terms "pick-up" or "store" or "deposit" or "retrieve" may collectively refer to various operations performed by the vertical lifts and the autonomous vehicle in the rack storage system. Thus, use of any such terms should not be taken to limit the spirit and scope of embodiments of the present disclosure.

As used herein, the term "load handling station" may be used to refer to a pick-up and deposit (P&D) conveyor or infeed/outfeed conveyor or buffer conveyor which can support and convey loads using one or more conveying elements. Thus, use of any such terms should not be taken to limit the spirit and scope of embodiments of the present disclosure.

As used herein, the terms "guide track" or "guide rail" or "support rail" may be used to refer to guideways or pathways through which the vertical lifts and the autonomous vehicle are guided to store and retrieve the loads. Thus, use of any such terms should not be taken to limit the spirit and scope of embodiments of the present disclosure.

As used herein, the terms "storage system", "retrieval system", "rack storage system", "automated storage and retrieval system" may be used to refer to any portion of a warehouse or a distribution center having multiple storage racks with a provision to store and retrieve one or more loads. Thus, use of any such terms should not be taken to limit the spirit and scope of embodiments of the present disclosure.

As used herein, the terms "infeed station", "outfeed station" may be used to refer to a goods to operation station or conveyors operating in conjunction with the goods to operator station. Thus, use of any such terms should not be taken to limit the spirit and scope of embodiments of the present disclosure.

As used herein, the terms "plates", "braces", "brackets", "mounts", "side guide", "side rail" may be used to refer to structural elements with provisions to mechanically couple with other structural elements of a mechanical system or an electrical system.

As used herein, the terms "loads" or "load" may be used to refer to items, products, articles, packages, baggage, luggage, storage containers such as trays, totes, cartons, boxes, or pallets. Thus, use of any such terms should not be taken to limit the spirit and scope of embodiments of the present disclosure.

Generally, a storage and retrieval system may be provided as a two-dimensional or three-dimensional storage and retrieval system. Such storage and retrieval system are often referred to as Automated Storage and Retrieval System (ASRS or AS/RS). In such automated storage and retrieval system, throughput is always a concern due to increase in storage and retrieval times. Further, retrieving loads from the storage racks in a quick and efficient manner has been a constraint in most of the automated storage and retrieval system. Typically, the transport devices may be movable in vertical directions and horizontal directions within the aisles which is defined between two adjacent storage racks for storing and retrieving the loads. Each storage rack may be of a predefined height configured with multiple storage levels with predefined depth to store the loads picked up by the transport devices. One such transport device which can move vertically at different heights between the multiple storage levels is a vertical lift.

In some examples, the loads transported to/from the storage levels are contained in storage containers such as trays, totes, cartons, boxes or on pallets. Depending on a storage capacity of the storage racks, the racks may be known as high density racks or ultra-high-density racks. Such storage containers are stored in the storage racks and retrieved from the storage racks using the vertical lift for performing operations such as, for example, order fulfilment or replenishment or building mixed pallets. While vertical lifts of various configurations have been proposed to store and retrieve the loads or storage containers for fulfilling such operations in a warehouse or a distribution center, the prior known configurations of the vertical lifts have certain drawbacks. Some of the considerations while designing the configurations of the vertical lifts to overcome the prior drawbacks are: minimize the storage and retrieval time; maximize safety in handling loads during storage and retrieval by minimizing slippage, misalignment and jam, minimize wear and tear of components of the vertical lifts by modifying the configuration/arrangement to handle overload, stress, vibrations, derailing and other external factors affecting the lifespan and safety of the vertical lifts and its components.

Through applied effort, ingenuity, and innovation, many of the above identified problems have been solved by developing solutions that are included in embodiments of the present disclosure, many examples of which are described in detail herein. The present disclosure relates to a conveyor carriage and a load handling station installed in a vertical lift structure with a configuration to maximize safety of the loads and various components of the conveyor carriage and the load handling station while minimizing maintenance. According to an embodiment, the conveyor carriage and the load handling station are a part of the storage and retrieval system capable of storing loads at multiple storage levels. According to an embodiment, the conveyor carriage includes a drop-down plate hingedly mounted to a conveyor frame and pivotable between an open position and a closed position. According to another embodiment, the load handling station includes a control box with a lid pivotable between a closed position and an open position. According to an embodiment, the lid and the drop-down plate encloses various components of the load handling station and the conveyor carriage respectively in the closed position for minimizing wear and tear of the various components when operating in the storage and retrieval system.

According to an embodiment, the lid may act as a slidable support when an autonomous vehicle retrieves the loads from the load handling station while protecting the components from damage.

According to an embodiment, the control box positioned adjacent the load handling station to bridge a gap between the load handling station and a guide track of the autonomous vehicle.

According to an embodiment, the conveyor carriage includes a locking mechanism to lock the drop-down plate with the conveyor frame in the closed position.

According to an embodiment, the load handling station comprises one of conveyor rollers or conveyor belts or a combination thereof to transport the loads for pick up and deposit by the autonomous vehicle.

According to an embodiment, the drop-down plate and the lid is pivoted to the open position to access the various components of the conveyor carriage and the load handling station.

According to an embodiment, the conveyor carriage and the load handling station may include sensors to align the conveyor carriage with the load handling station and to detect presence of a load on the conveyor carriage and the load handling station.

In the following detailed description of exemplary embodiments of the disclosure, specific representative embodiments in which the disclosure may be practiced are described in sufficient detail to enable those skilled in the art to practice the disclosed embodiments. For example, specific details such as specific method orders, structures, elements, and connections have been presented herein. However, it is to be understood that the specific details presented need not be utilized to practice embodiments of the present disclosure. It is also to be understood that other embodiments may be utilized and that logical, architectural, programmatic, mechanical, electrical and other changes may be made without departing from the general scope of the disclosure. The following detailed description is, therefore, not to be taken in a limiting sense, and the scope of the present disclosure is defined by the appended claims and equivalents thereof.

Throughout this specification, the terms 'conveyors' or 'conveyor devices' or 'conveyor system' may be used interchangeably and these terms should be taken as an example of both roller conveyor, a belt conveyor, or their combination.

Throughout this specification, the terms 'rollers' or 'conveyor rollers' may be used interchangeably and the term 'belt' or 'conveyor belt' may be used interchangeably and should be taken as an example of a medium which transports loads on the conveyor system.

Throughout this specification, the terms 'hinged' or 'hingedly' or 'transitioned' or 'pivoted' or 'pivotable' may be used interchangeably and should be taken as an example of a provision provided to a component such as a lid or a plate to rotate from one position to another position.

Throughout this specification, the terms 'storage and retrieval system' or 'rack storage system' may be used interchangeably and should be taken as an example of a system having storage racks.

Generally, storage and retrieval system operate under computerized control, maintaining an inventory of stored loads. Retrieval of loads is accomplished by specifying the load type and quantity to be retrieved. The computer determines where in the storage area the load can be retrieved from and schedules the retrieval. The autonomous vehicles and the vertical lifts are sometimes part of the storage and retrieval system. In some storage and retrieval system, the horizontal movement in the storage racks within the system is made by independent shuttles each operating on one level of the storage rack while the vertical lift at a fixed position within the storage rack is responsible for the vertical movement. In some storage and retrieval system, the autonomous vehicle picks up or drops off loads at specific load handling stations in the storage area provided along with the storage rack. Inbound and outbound loads are precisely positioned for proper handling in the load handling stations. Various aspects of the present disclosure are described in connection with conveyor carriages used with the vertical lifts and the load handling stations of the storage and retrieval system to ensure safe handling of the loads.

Figure 1B:
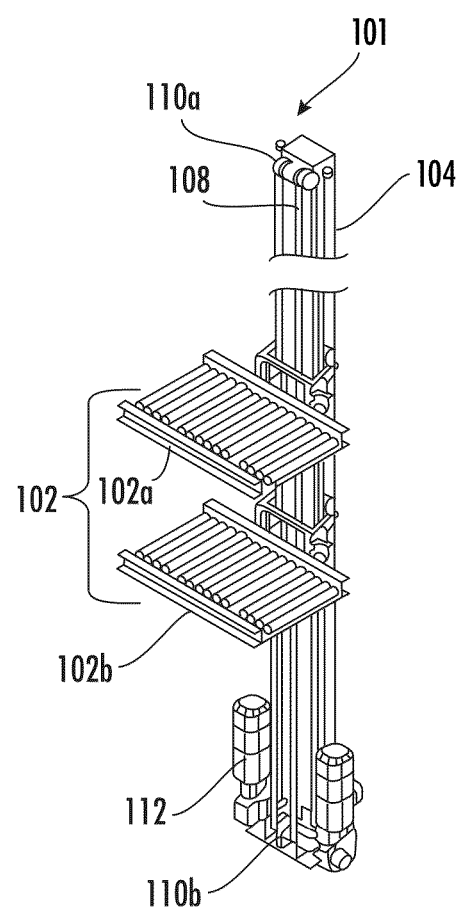
Figure 7:
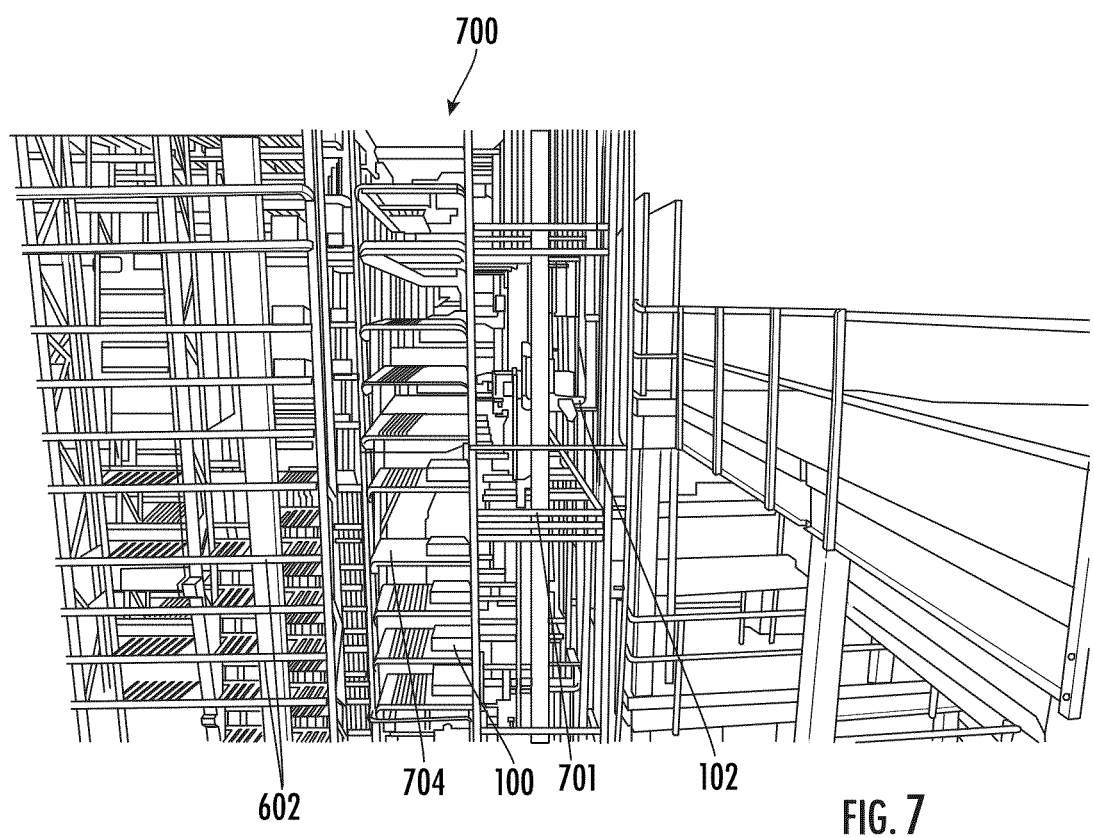
FIG. 7 discloses a perspective view of a rack storage system in which the vertical lift structure of FIG. 1A is installed, in accordance with an embodiment of the present invention.

Referring now specifically to the drawings and the illustrative embodiments depicted therein, FIGS. 1A and 1B discloses a perspective view of a dual conveyor carriage 102 on two different vertical lift structures 100, 101, in accordance with an embodiment of the present invention. FIG. 1B discloses an embodiment of the dual conveyor carriage 102 mounted to a vertical lift structure 101 having a central support rail 104 and FIG. 1A discloses another embodiment of the dual conveyor carriage 102 mounted to a vertical lift structure 100 having dual support rails 106a, 106b, one rail 106a installed in parallel with the other rail 106b with two conveyor carriages 102 positioned in between the rails. Both configurations of the vertical lift as shown in FIGS. 1A and 1B includes two conveyor carriages 102 independently movable on the support rail 104 or rails 106a, 106b to handle loads stored in the storage racks of the storage and retrieval system, however, it is conceivable to use a single conveyor carriage on the vertical lift structures 100, 101 as shown in FIGS. 1A and 1B. According to an embodiment, a first conveyor carriage 102a and a second conveyor carriage 102b on the vertical lift structures 100, 101 may pick up and deposit the loads between the load handling stations on the storage racks and outfeed stations/infeed stations. In some examples, the first conveyor carriage 102a may be employed to pick and deposit the loads at load handling stations of a first set of storage levels and the second conveyor carriage 102b may be employed to pick and deposit the loads at load handling stations of a second set of storage levels. In some examples, both the first conveyor carriage 102a and the second conveyor carriage 102b may be employed to pick and deposit the loads at the load handling stations of any of the storage levels of the storage rack. In some examples, the first conveyor carriage 102a may pick the loads from the infeed station and deposit the loads at a load handling station of a selected storage level and the second conveyor carriage 102b may pick the loads from the load handling station of the selected storage level and deposit the loads at the outfeed station. In some examples, both the first conveyor carriage 102a and the second conveyor carriage 102b may simultaneously pick and deposit the loads from or to the load handling station, the infeed station, and the outfeed station. In some examples, both the first conveyor carriage 102a and the second conveyor carriage 102b may pick the loads from the infeed station and deposit the load at a common load handling station at a selected storage level without collision between the first conveyor carriage 102a and the second conveyor carriage 102b. Similarly, both the first conveyor carriage 102a and the second conveyor carriage 102b may pick the loads from the common load handling station at the selected storage level and deposit the loads at the outfeed station without collision between the first conveyor carriage 102a and the second conveyor carriage 102b. Such configurations of the dual conveyor carriages 102 operating in the storage and retrieval system to pick and deposit the loads without any collision is disclosed in U.S. Pat. No. 10,611, 568, incorporated herein as a reference. A perspective view of a rack storage system with the storage racks and the load handling stations is shown in FIG. 6 and FIG. 7.

According to an embodiment, the first conveyor carriage 102a and the second conveyor carriage 102b are driven independently using driving systems. The driving systems may include drive belts 108, drive pulleys 110a, 110b, and drive motors 112. The drive belts 108 are received for vertical rotation respectively on a pair of top drive pulleys 110a and received independently on a pair of bottom drive pulleys 110b, wherein the bottom drive pulleys 110b are driven by a pair of drive motors 112. The drive motors 112 independently rotate the bottom drive pulleys 110b to independently control movement of the first conveyor carriage 102a and the second conveyor carriage 102b. According to an embodiment, as shown in FIGS. 1A and 1B, the drive belts are installed on the support rail 104 or rails 106a, 106b. In FIG. 1A, the drive belts 108 are installed on the parallel support rails 106a, 106b, one drive belt on each support rail 106a, 106b and in FIG. 1B the drive belts 108 are installed on the central support rail 104. According to an embodiment, the drive belts 108 facilitate the movement of the first conveyor carriage 102a and the second conveyor carriage 102b on the support rail 104 or rails 106a, 106b under the influence of the drive motors 112. In some examples, the drive motors 112 include a motor encoder to track a position of the first conveyor carriage 102a and the second conveyor carriage 102*b* when guided on the support rail 104 or rails 106*a*, 106*b*. According to an embodiment, as shown in FIG. 1A, each support rail 106*a*, 106*b* is mounted to a pair of vertical mast 114. For example, a first support rail 106*a* may be positioned in between a first pair of vertical mast 114*a* and a second support rail 106*b* positioned in between a second pair of vertical mast 114*b*. The first support rail 106*a* and the second support rail 106*b* mounted to the first pair of vertical mast 114*a* and the second pair of vertical mast 114*b* respectively using mounting brackets 116. According to an embodiment, the first support rail 106*a* and the second support rail 106*b* are mounted to a pair of top housings 118 and a bottom housing 120 common for the first support rail 106*a* and the second support rail 106*b*. For example, one end of the first support rail 106*a* and the second support rail 106*b* may be attached to a first set of attachment plates 121 on the pair of top housings 118 and other end of the first support rail 106*a* and the second support rail 106*b* may be attached to a second set of attachment plates 122 on the bottom housing 120, wherein the attachment plates 121, 122 ensures proper alignment of the first support rail 106*a* and the second support rail 106*b*. In some examples, the bottom housing 120 may include components such as the drive motors 112, bottom drive pulleys 110*b*, bearings (not shown), and bottom spreader 124. In some examples, the pair of top housings 118 may include components such as the top drive pulleys 110*a*, bearings (not shown), top spreader 123, and a pair of access plates 125 for maintenance of the components inside the top housings 118. According to an embodiment, the first conveyor carriage 102*a* and the second conveyor carriage 102*b* positioned in between the top housings 118 and the bottom housing 120 are driven independently using the components inside the top housings 118 and the bottom housing 120. According to an embodiment, the first conveyor carriage 102*a* and the second conveyor carriage 102*b* may be positioned in the vertical lift structure having a single common support rail without any housings for the components as disclosed in U.S. Pub. No. 20200071074 incorporated herein for reference. Considering the first conveyor carriage 102*a* and the second conveyor carriage 102*b* being structurally identical, FIG. 2 discloses a top perspective view of a conveying carriage 102 on the vertical lift structure 100 of FIG. 1A. According to embodiment, the conveyor carriage 102 depicted in FIG. 2 may also be used on the vertical lift structure 101 as shown in FIG. 1B. According to an embodiment, the conveyor carriage 102 depicted in FIG. 2 may also be used on any vertical lift structure generally known in the art including provisions to install and guide the conveyor carriage 102.

Figure 2:
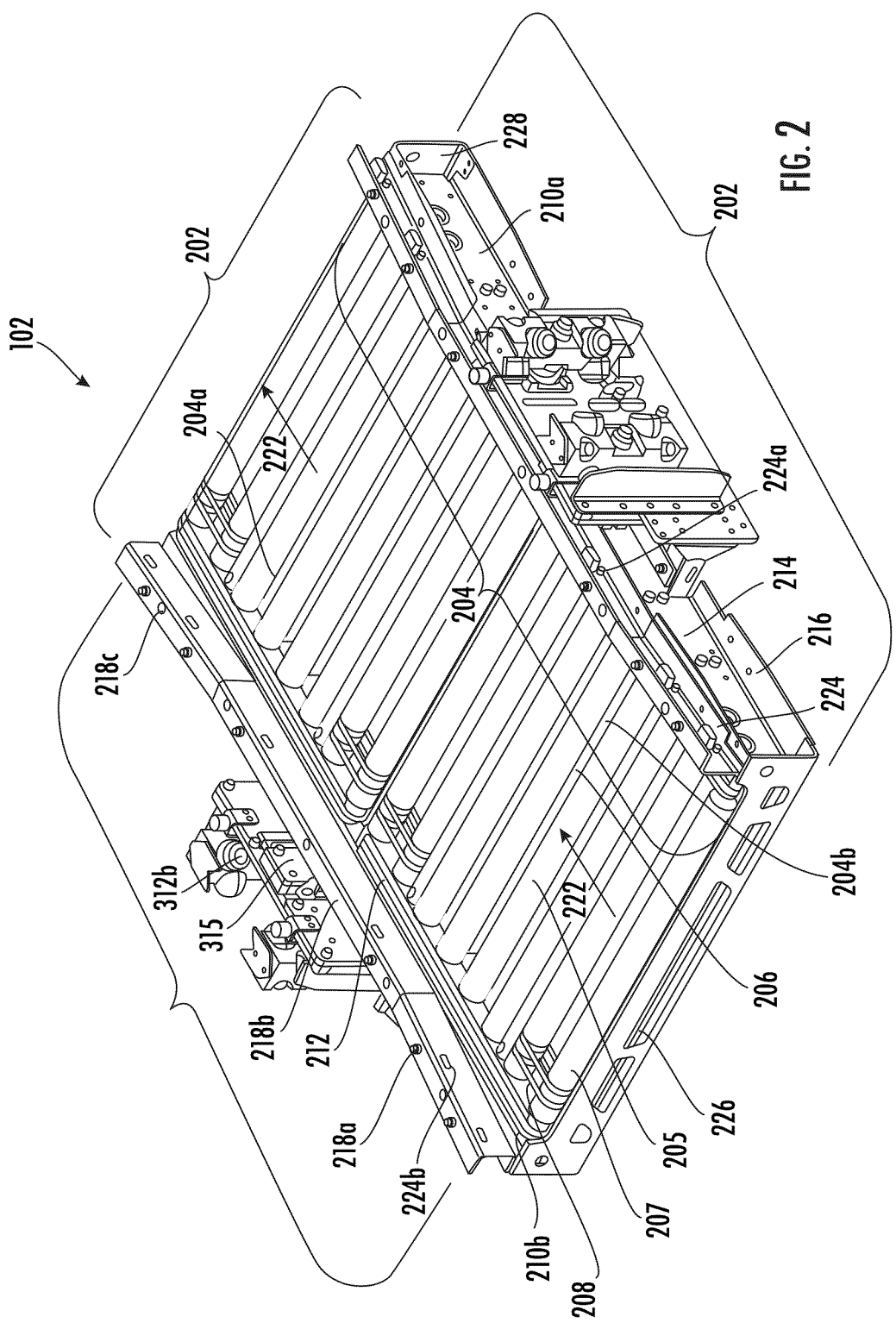
FIG. 2 discloses a top perspective view of a conveying carriage on the vertical lift structure of FIG. 1A, in accordance with an embodiment of the present invention FIG. 3 discloses a bottom perspective view of the conveying carriage on the vertical lift structure of FIG. 1A, in accordance with an embodiment of the present invention.

According to an embodiment, the conveyor carriage 102 includes a conveyor frame 202, a pair of side rails 210*a*, 210*b*, a load carrying portion 204, an attachment bracket 304, and a drop-down plate 302. According to an embodiment, the load carrying portion 204 of the conveyor carriage 102 may be configured to support the load. According to an embodiment, the load carrying portion 204 may be configured to transfer the load to the load handling station. In some examples, the load carrying portion 204 includes one or more conveying elements, such as, but not limited to, conveyor rollers 205, conveyor belt 206 or their combination to support and transfer the load to the load handling station. In the embodiment shown in FIG. 2, the load carrying portion 204 includes a plurality of conveyor rollers 205 with a conveyor belt 206 wrapped around the rollers 205. According to an embodiment, the rollers 205 include at least one motorized drive roller (MDR). The MDR may drive the conveyor belt 206 wrapped around the rollers 205 to facilitate movement of the load. In some examples, the MDR may be positioned in between the plurality of rollers 205 and linked to neighboring conveyor rollers 205 using 0-Bands 208. In some examples, the MDR may be positioned as an end roller 207 or next to the end roller and linked to neighboring conveyor rollers 205 using the O-Bands 208. According to an embodiment, the load carrying portion 204 may include two sets of conveyor rollers 205 wrapped around independently using two conveyor belts 206 with each set of conveyor rollers 205 having at least one MDR to drive the conveyor belts 206. Such a configuration enables the two sets of conveyor rollers 205 wrapped independently by two conveyor belts 206 to be considered as two different conveyor zones 204*a*, 204*b* which are independently controlled to move the load into or out of the load handling station. As shown in FIG. 2, the load carrying portion 204 is coupled to the conveyor frame 202 and sandwiched between the pair of side rails 210*a*, 210*b* of the conveyor frame 202. The pair of side rails 210*a*, 210*b* include a first side rail 210*a* and a second side rail 210*b*, each rail having a plurality of slots (not shown) to receive the load carrying portion 204. For example, axles (not shown) of the rollers 205 are seated on corresponding slots in the pair of side rails 210*a*, 210*b* in a parallel uniform arrangement from an upstream side 220 of the conveyor carriage 102 to a downstream side 222 of the conveyor carriage 102. According to an embodiment, the rollers may be coupled to cartridge frames with side plates and arcuate sloped surfaces as disclosed in U.S. Pat. No. 10,239,696, incorporated herein by reference with the cartridge frames being attached to the pair of side rails 210*a*, 210*b* using suitable fasteners. In some examples, the cartridge frames may be attached to the pair of side rails 210*a*, 210*b* using axle retainers as disclosed in U.S. Pat. No. 10,669,102, incorporated herein by reference.

According to an embodiment, the conveyor frame 202 further includes a top plate 214 attached on an upper surface of each side rail 210*a*, 210*b* and a bottom plate 216 attached on a bottom surface of each side rail 210*a*, 210*b*. The top plate 214 and the bottom plate 216 extend out parallelly from the side rails 210*a*, 210*b* along a plane perpendicular to the side rails 210*a*, 210*b*. For example, the top plate 214 and the bottom plate 216 form right angles with a side surface of the side rails 210*a*, 210*b* when the top plate 214 and the bottom plate 216 are attached to the upper surface and the bottom surface of the side rails 210*a*, 210*b*. According to an embodiment, the conveyor frame 202 further includes a side guide 218 attached to the top plate 214 of each side rail 210*a*, 210*b*. For example, the side guide 218 may be fastened to the top plate 214 on each side rail 210*a*, 210*b* using suitable fasteners. According to an embodiment, the side guide 218 on the top plate 214 of each side rail 210*a*, 210*b* may be flared at opposing ends of the side guide 218. For example, the side guide 218 on the upstream side 220 and the downstream side 222 of the conveyor carriage 102 may be flared to enable smooth movement of the loads into conveyor carriage 102 from the upstream side 220 and out of the conveyor carriage 102 from the downstream side 222. In some examples, the side guide 218 is formed by coupling multiple guide portions 218*a*, 218*b*, 218*c* with each other throughout a length of the conveyor carriage 102 from the upstream side 220 to the downstream side 222. For example, the side guide 218 may include a first guide portion 218*a*, a second guide portion 218*b* and a third guide portion 218*c*. The first guide portion 218*a* provided on the upstream side 220 of the conveyor carriage 102 and the third guide portion 218*c* provided on the downstream side 222 of the conveyor carriage 102 and the second guide portion 218b provided between the first guide portion and the third guide portion 218c. The first guide portion 218a and the third guide portion 218c may be flared. According to an embodiment, one or more sensors may be positioned on the side guide 218 to detect presence of the load on the load carrying portion 204. For example, the side guide 218 may include one or more sensor mounts 224a with a corresponding opening 224b for positioning the one or more sensors 224 on the side guide 218. The one or more sensors 224, for example, may be optical sensors such as photoeye sensors, laser sensors, infrared sensors, ultraviolet sensors, or the like configured to detect the presence of the load on the load carrying portion 204. In some examples, a vision sensor such as a camera may be installed on the side guide 218 to detect the presence of the load.

According to an embodiment, the conveyor frame 202 further includes a front bracket 226 and a back bracket 228 attached to the top plate 214 and the bottom plate 216 of each side rail 210a, 210b. The front bracket 226 is provided at the upstream side 220 of the conveyor carriage 102 and fastened to one end of the top plate 214 and the bottom plate 216. Similarly, the back bracket 228 is provided at the downstream side 222 of the conveyor carriage 102 and fastened to other end of the top plate 214 and the bottom plate 216. According to an embodiment, the front bracket 226, the back bracket 228, the top plate 214, and the bottom plate 216 are coupled together to form a protective housing for various components and wirings/cables of the various components of the conveyor carriage 102. The coupling of the brackets 226, 228 and plates 214, 216 may be enabled using any suitable fasteners known in the art.

Figure 3:
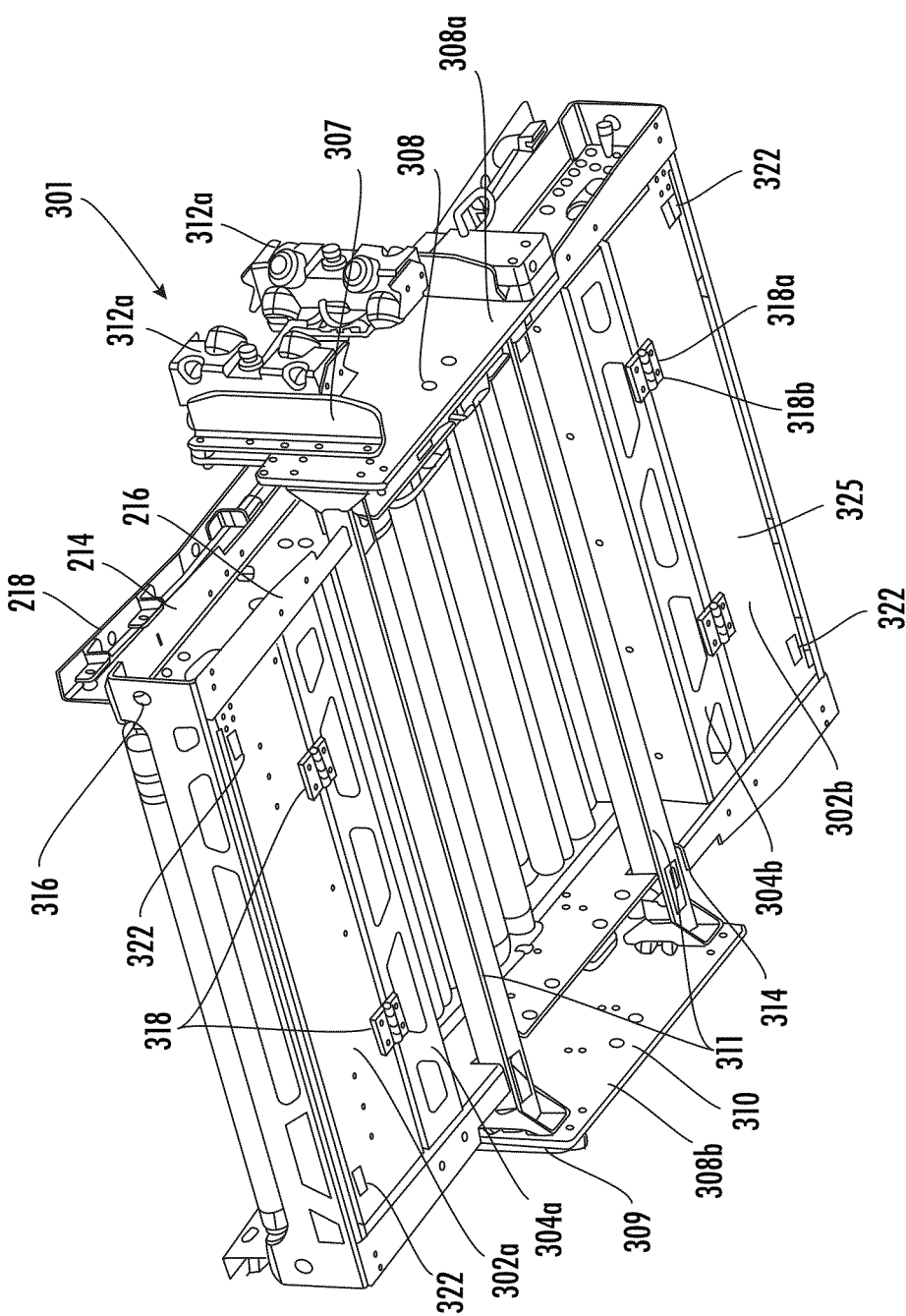

According to an embodiment, the conveyor carriage 102 is vertically guided on the vertical lift structure 100 of FIG. 1A using a lifting unit 301. According to an embodiment, the conveyor carriage 102 and the lifting unit 301 together form the vertical lift 601, 701 as shown in FIG. 6 and FIG. 7. As shown in FIGS. 2 and 3, the lifting unit 301 includes a first set of guide rollers 312a mounted on a first pair of roller mounting plates 307, a second set of guide rollers 312b mounted on a second pair of roller mounting plates 309, a pair of spreaders 311, a first spreader mounting plate 308 with an outer surface 308a coupled to the first pair of roller mounting plates 307 and an inner surface 308b coupled to one end of the pair of spreaders 311, a second spreader mounting plate 310 with an outer surface coupled to the second pair of roller mounting plates 309 and the inner surface 308b coupled to another end of the pair of spreaders 311. According to an embodiment, the lifting unit 301 may include only one spreader connecting the first spreader mounting plate 308 with the second spreader mounting plate 310. The first set of guide rollers 312a and the second set of guide rollers 312b are guided on the support rails 106a, 106b of the vertical lift structure 100 of FIG. 1A. The lifting unit 301 is driven vertically by the drive belt 108 installed on the support rails 106a, 106b. According to an embodiment, the conveyor carriage 102 is seated on top of at least one spreader 311 and capable of moving vertically with the lifting unit 301. For example, each of the side rails 210a, 210b of the conveyor frame 202 includes a cut-out 314 to facilitate mounting of the conveyor carriage 102 on the at least one spreader 311. According to an embodiment, the lifting unit 301 may include a belt tensioner module 315 attached to the first spreader mounting plate 308 and the second spreader mounting plate 310 to adjust a tension of the drive belt 108 driving the conveyor carriage 102. In some examples, the belt tensioner module 315 may include tensioner springs to adjust the tension of the drive belt 108. According to an embodiment, one or more additional sensors 316 may be positioned on the front bracket 226 or the back bracket 228 to position the conveyor carriage 102 with the load handling station when conveyor carriage 102 is vertically guided on the vertical masts 114a, 114b. The one or more additional sensors 316 includes, for example, photoeye sensors, laser sensors, infrared sensors, ultraviolet sensors, vision sensors or the like configured to detect the presence of the load handling station and stop the conveyor carriage 102 to initiate transfer of the load to the load handling station.

According to an embodiment, the drop-down plate 302 is attached to the conveyor frame 202. According to an embodiment, the drop-down plate 302 is hingedly attached to the conveyor frame 202 using the attachment bracket 304. According to another embodiment, the drop-down plate 302 is hingedly attached to the conveyor frame 202 using the bottom plate 216 on each side rail 210a, 210b. According to an embodiment, as shown in FIG. 3, a pair of drop-down plates 302a, 302b may be attached to the conveyor frame 202 with one drop-down plate 302 at the upstream side 220 of the conveyor carriage 102 and with other drop-down plate 302 at the downstream side 222 of the conveyor carriage 102. According to an embodiment, the pair of drop-down plates 302a, 302b is hingedly attached to the conveyor frame 202 using a pair of attachment brackets 304a, 304b. According to another embodiment, the pair of drop-down plates 302a, 302b is hingedly attached to the conveyor frame 202 using the bottom plate 216 on each side rail 210a, 210b. According to an embodiment, the drop-down plate 302 is coupled to the attachment bracket 304 or the bottom plate 216 with a hinge mechanism 318. The hinge mechanism 318, for example, is a butt-hinge or spring-hinge as known in the art. As shown in FIG. 3, one leaf 318b of the hinge is fastened to the attachment bracket 304 and other leaf 318a of the hinge to the drop-down plate 302 to enable hinged connection between the attachment bracket 304 and the drop-down plate 302.

Figure 4:
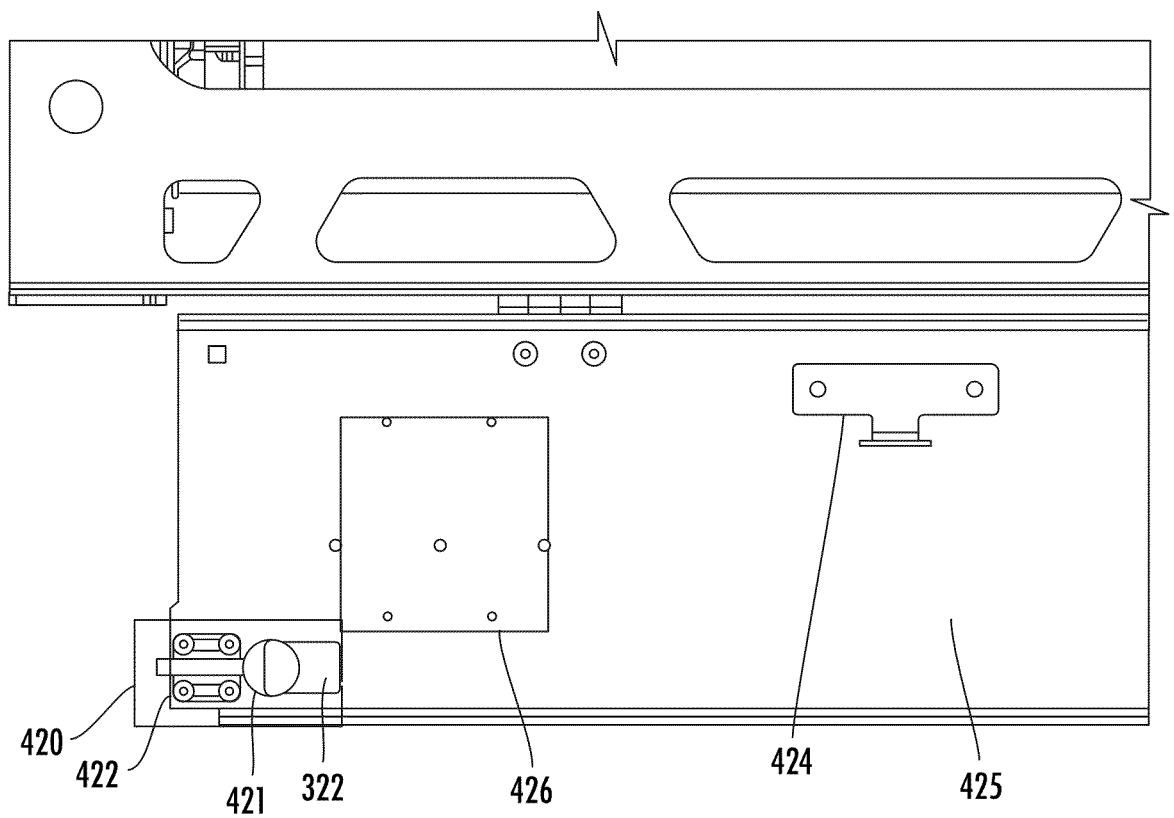
FIG. 4 discloses a partial front view of the drop-down plate of FIG. 3 with a locking mechanism, in accordance with an embodiment of the present invention.

According to an embodiment, as shown in FIG. 4, the drop-down plate 302 includes a locking mechanism 420 to lock the drop-down plate 302 with the conveyor frame 202. The locking mechanism 420, for example, includes spring-loaded pins 422 and finger rings 421. The spring-loaded pins 422 and the finger rings 421 are attached to an inner surface 425 of the drop-down plate 302 while an outer surface 325 of the drop-down plate 302 is attached to the hinge mechanism 318. In some examples, the locking mechanism 420 may include magnets on the inner surface 425 to hold the drop-down plate 302 with the conveyor frame 202 with a magnetic attraction force. According to an embodiment, as shown in FIG. 4, the drop-down plate 302 further includes a pair of access openings 322 provided formed integrally on the drop-down plate 302. The pair of access openings 322 are formed adjacent and overlapping the finger rings 421. The pair of access openings 322 are provided to access the finger rings 421 on the inner surface. For example, the pair of access openings 322 facilitates an operator to reach the finger rings 421 from the outer surface of the drop-down plate 302. According to an embodiment, as shown in FIG. 4, the drop-down plate 302 further includes mounting apertures 426 and wiring clamps 424 provided on the inner surface of the drop-down plate 302. The mounting apertures 426 are provided to mount one or more components of the conveyor carriage 102 to the inner surface 425. According to an embodiment, the one or more components 502 include, but not limited to, control components 502a, I/O components 502b, communication components 502c, and power components 502d. Further, the wiring clamps 424 are provided to route the wiring of the one or more components 502 through wiring holes provided on each side rail 210a, 210b, wherein the wiring is further routed through additional clamps 506 provided on each side rail 210a, 210b. According to an embodiment, the wiring may be housed in between the top plate 214 and the bottom plate 216 attached to each side rail 210a, 210b. Such a configuration with wiring clamps 424 and wiring holes is provided for ease of installation, maintenance, and safety.

Figure 5A:
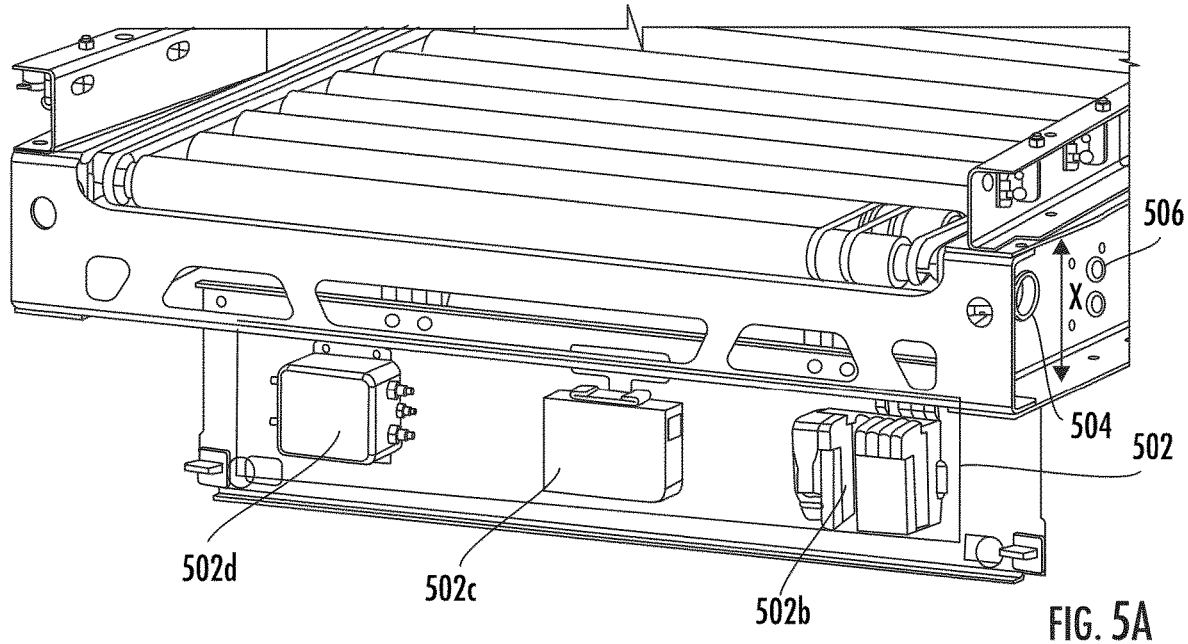
FIGS. 5A and 5B discloses a perspective view of the conveying carriage of FIG. 3 with drop-down plates in an open position, in accordance with an embodiment of the present invention.
Figure 5B:
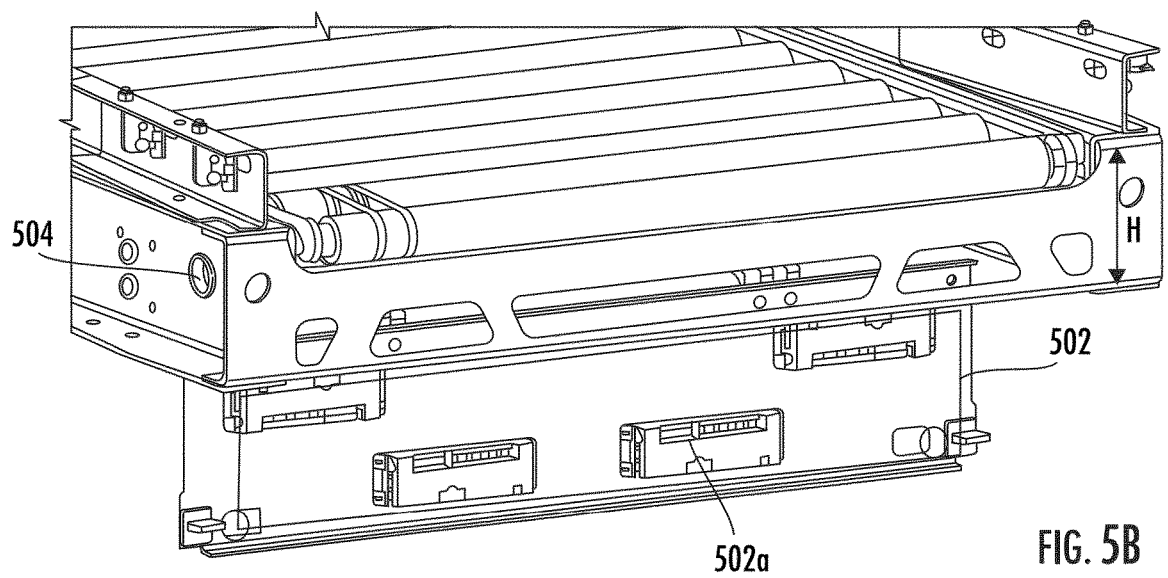

According to an embodiment, the drop-down plate 302 is pivoted from a closed position to an open position and vice-versa. For example, the drop-down plate 302 may transition to the open position and the closed position using the hinge mechanism 318. FIG. 3 shows a view of the drop-down plate 302 in the closed position, and FIGS. 5A and 5B shows a view of the drop-down plate 302 in the open position. According to an embodiment, the drop-down plate 302 encloses the one or more components 502 of the conveyor carriage 102 in the closed position. According to an embodiment, the one or more components 502 attached to the mounting apertures 426 on the inner surface of the drop-down plate 302 is accessible in the open position. According to an embodiment, the drop-down plate 302 is locked in the closed position with the conveyor frame 202 using the locking mechanism 420 as shown in FIG. 4. For example, the finger rings 421 on the inner surface attached to the spring-loaded pins 422 can be retracted by the operator through the access openings 322 from the outer surface when the drop-down plate 302 is in the open position. After pivoting the drop-down plate 302 to the closed position, the retracted finger rings 421 may then be released by the operator such that the spring-loaded pins 422 are seated into a corresponding locking aperture (not shown) provided on the side rails 210a, 210b. In this manner, the drop-down plate 302 may be locked with the conveyor frame 202 using the spring-loaded pins 422 and the finger rings 421. According to an embodiment, the inner surface 425 of the drop-down plate 302 and the load carrying portion 204 may be provided with a clearance that is substantially equal to a distance 'X' between the top plate 214 and the bottom plate 216 on each side rail 210a, 210b as shown in FIG. 5A. Such a clearance is provided to ensure that a risk of accidental contact between the one or more components 502 and the load carrying portion 204 is eliminated when the drop-down plate 302 is in the closed position. According to an embodiment, the clearance may be substantially equal to a height 'H' of the front bracket 226 or the back bracket 228 as shown in FIG. 5A. According to an embodiment, the drop-down plate 302 may have a 'C' shaped or a shaped profile. According to another embodiment, the drop-down plate 302 may be a flat plate.

According to an embodiment, the drop-down plate 302 is released from the conveyor frame 202 using the locking mechanism 420 to pivot the drop-down plate 302 from the closed position to the open position. For example, the finger rings 421 attached to the spring-loaded pins 422 can be retracted through the access openings 322 such that the spring-loaded pins 422 that are seated into the corresponding locking aperture provided on the side rails 210a, 210b is moved out of contact with the aperture transitioning the drop-down plate 302 to the open position. In some examples, a spring-hinge may be used as the hinge mechanism 318 to gradually transition the drop-down plate 302 to the open position upon releasing the spring-loaded pins 422 from the locking aperture. FIGS. 5A and 5B show a view of the pair of drop-down plates 302a, 302b in the open position with the one or more components 502 of the conveyor carriage 102 mounted in a distributed manner between the pair of drop-down plates 302a, 302b. For example, FIG. 5A shows a view of one of the pair of drop-down plates 302a, 302b in which the I/O components 502b, the power components 502d and the communication components 502c are mounted and FIG. 6B shows a view of one of the pair of drop-down plates 302a, 302b in which the control components 502a are mounted. According to an embodiment, a single drop-down plate 302 may be provided on the conveyor carriage 102 for mounting the I/O components 502b, the power components 502d, the communication components 502c, and the control components 502a. In some examples, the power components 502d may include a power filter to transfer and filter power from a power rail supplying power to the conveyor carriage 102. In some examples, the communication components 502c may include a communication modem and bus transmitter enabling ethernet communication. In some examples, the control components 502a may include a motor driven roller (MDR) control card to control the drive rollers of the conveyor carriage 102. In some examples, the I/O components 502b may include I/O modules with M8 connections or M12 connections or their combination to receive cables/wirings from sensors and the control card. Such components 502 are enclosed within the conveyor frame 202 of the conveyor carriage 102 using the drop-down plate 302 such that the components 502 are not subjected to wear and tear during an operation of the conveyor carriage 102. Further, such components 502 are fixedly attached to the drop-down plate 302 which is locked with the conveyor frame 202 such that the components 502 are not subjected to jerks or vibration or accidental damage during an operation of the conveyor carriage 102. Further, such components 502 are made accessible by pivoting the drop-down plate 302 from the closed position to the open position facilitating ease of maintenance.

FIG. 6 discloses a perspective view of a rack storage system 600 in which the vertical lift structure 101 of FIG. 1B is installed, in accordance with an embodiment of the present invention. Further, FIG. 7 discloses a perspective view of a rack storage system 700 in which the vertical lift structure 100 of FIG. 1A is installed, in accordance with an embodiment of the present invention. The rack storage system 600, 700 as shown in FIGS. 6 and 7 include multi-level storage racks 602, load handling stations 604, 704, a vertical lift 601, 701 with a conveyor carriage 102, and an autonomous vehicle 901 as shown in FIG. 9. According to an embodiment, multiple autonomous vehicles 901, each servicing storage racks 602 at one storage level or storage racks 602 at multiple storage levels may be employed. According to an embodiment, the vertical lift structure 100, 101 including the vertical lift 601, 701 may be installed adjacent to the load handling stations 604, 704. One load handling station may be provided at each storage level which may be located adjacent the storage racks 602. The vertical lift 601, 701 may deposit a load 903 at a selected load handling station of a selected storage level and the load 903 may then be picked by the autonomous vehicle 901 to store the load 903 at a selected storage rack 602. According to an embodiment, the autonomous vehicle 901 may travel laterally or vertically on guide tracks 810 within the rack storage system 600, 700 to reach the selected storage rack 602. According to an embodiment, the vertical lift may retrieve a load 903 deposited by the autonomous vehicle 901 at the load handling station after retrieving the load 903 from the storage rack 602. Therefore, the load handling stations 604, 704 may handle loads 903 which are to be stored in the storage racks 602 or retrieved from the storage racks 602. According to an embodiment, the load handling stations 604, 704 may include one or more conveying elements to support and transfer the load 903 deposited or retrieved by the vertical lift 601, 701 or the autonomous vehicle 901. A sectional top view of one such load handling station used with the rack storage system 700 of FIG. 7 is disclosed in detail in FIG. 8.

Figure 8:
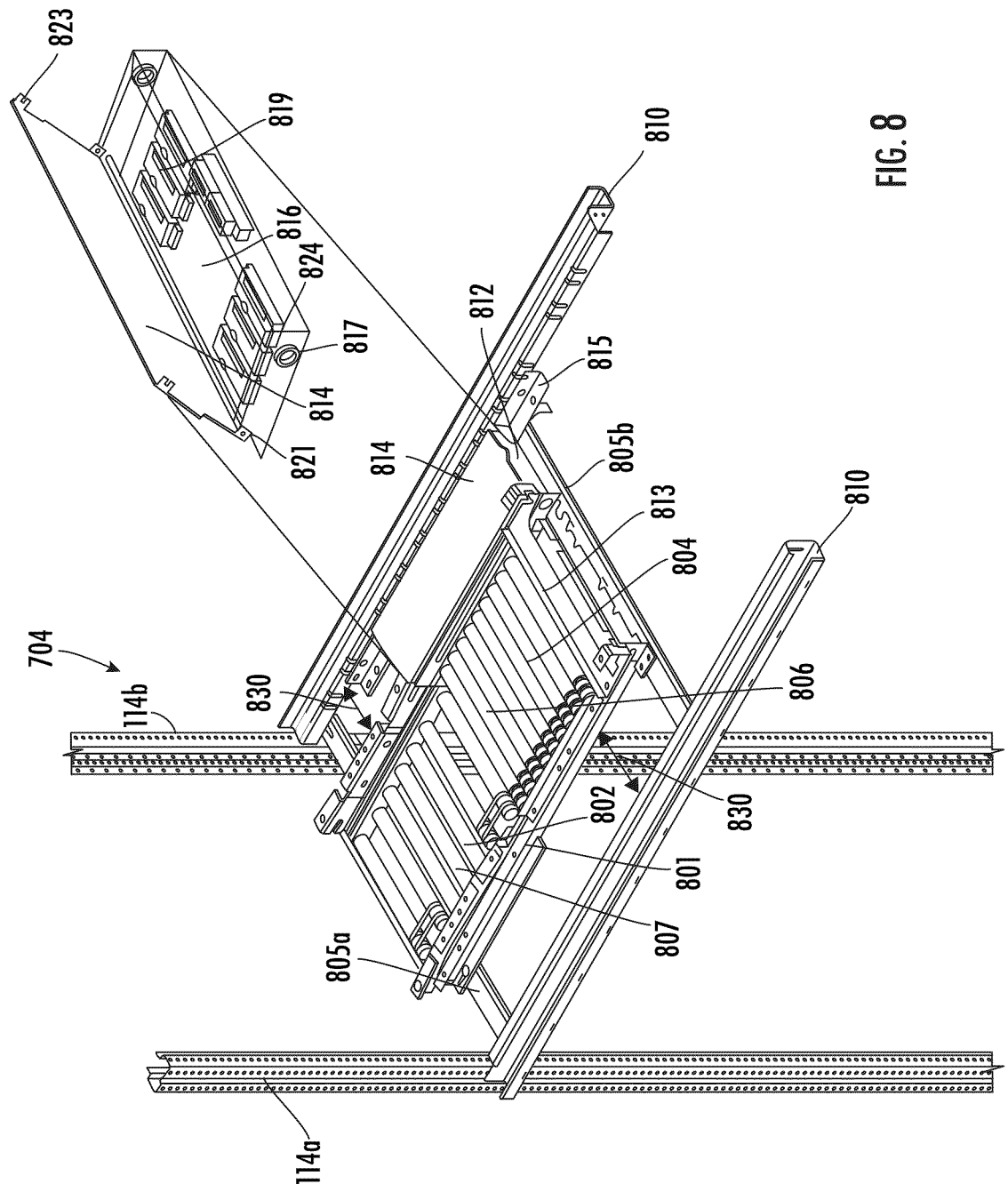
FIG. 8 discloses a sectional view of one of the storage levels of the rack storage system of FIG. 7, in accordance with an embodiment of the present invention.
Figure 9:
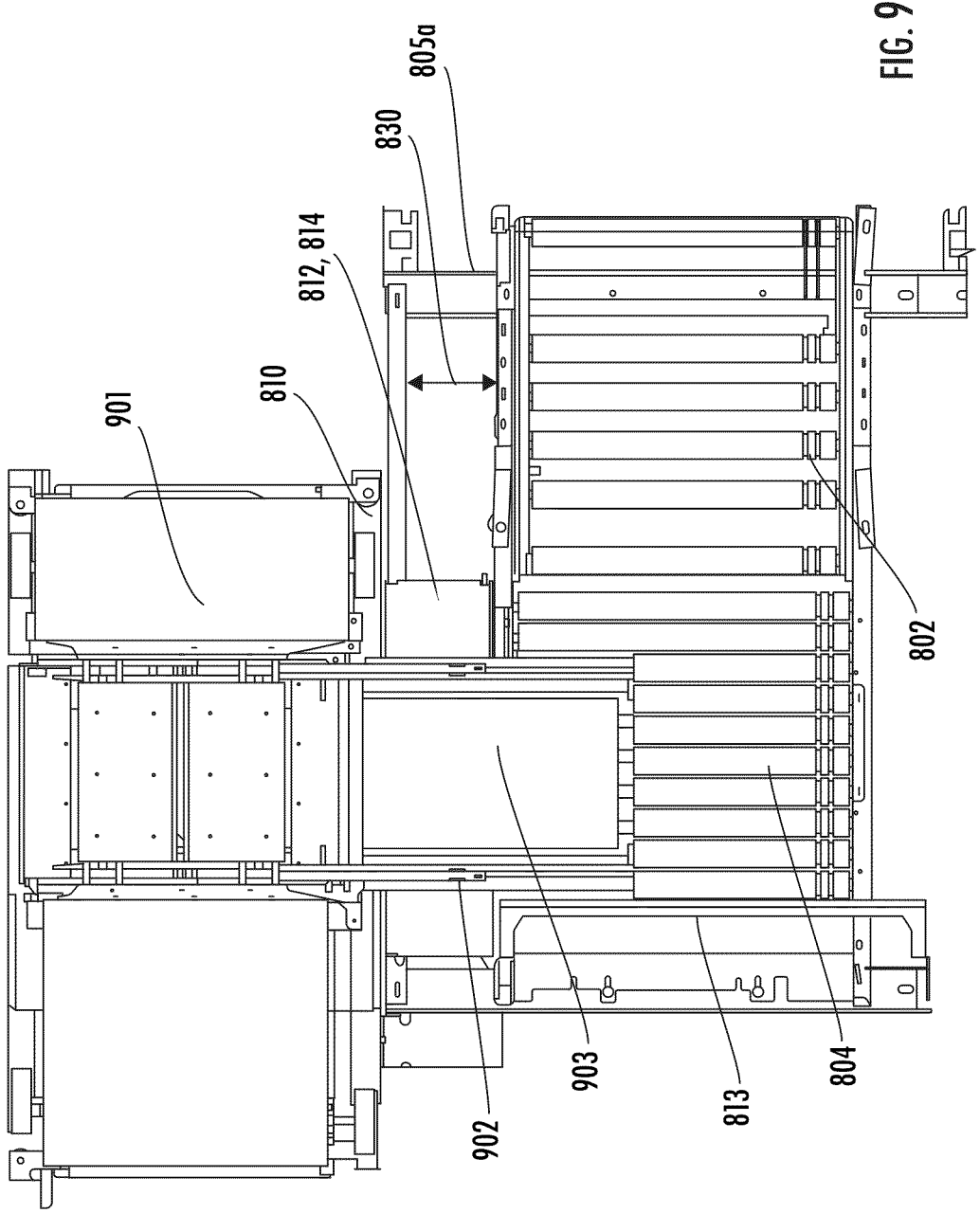
FIG. 9 discloses a top view of the storage level of FIG. 8 serviced by an autonomous vehicle, in accordance with an embodiment of the present invention.

As shown in FIG. 8, the load handling station 704 may include two conveyor zones 802, 804 802, 804 with one or more conveying elements to support and transfer the load 903 deposited or retrieved by the vertical lift 701 701 or the autonomous vehicle 901. According to an embodiment, the two conveyor zones 802, 804 may serve as both an infeed zone for receiving load 903 from the vertical lift 701 and an outfeed zone discharging the loads 903 to the vertical lift 701. According to an embodiment, the two conveyor zones 802, 804 may serve as a buffer zone to temporarily store the loads 903 for retrieval by the autonomous vehicle 901 or the vertical lift 701. The two conveyor zones 802, 804 may be mounted to a common conveyor frame 801 and attached to a pair of mounting braces 805a, 805b. The pair of mounting braces 805a, 805b includes a first mounting brace 805a attached to the vertical masts 114a, 114b of the vertical lift 701 and a second mounting brace 805b attached to the storage rack 602 of the rack storage system 700. According to an embodiment, the two conveyor zones 802, 804 may be attached to the first mounting brace 805a without any additional mounting braces for support. As shown in FIG. 8, the pair of mounting braces 805a, 805b may be positioned in between the guide tracks 810 of the autonomous vehicle 901. For example, the autonomous vehicle 901 may travel on the guide tracks 810 provided within the rack storage system 700 to reach the two conveyor zones 802, 804 of the load handling station 704 to deposit or retrieve the load 903. According to an embodiment, the two conveyor zones 802, 804 may include at least one motorized drive roller (MDR) to drive the conveyor and move the load 903 from one conveyor zone 802 to another conveyor zone 804. For example, the load 903 may be deposited by the vertical lift 701 to a first conveyor zone 802, which may then move the load 903 to the second conveyor zone 804 using the MDR of the first conveyor zone 802. In some examples, the load 903 may be deposited by the autonomous vehicle 901 to the second conveyor zone 804, which may then move the load 903 to the first conveyor zone 802 using the MDR of the second conveyor zone 804. According to an embodiment, the second conveyor zone 804 may include a load stop 813 to stop an overtravel of the load 903 moving from the first conveyor zone 802 on to the second conveyor zone 804. According to an embodiment, the two conveyor zones 802, 804 may include a plurality of rollers 806 with at least one motorized drive roller (MDR) and a belt 807 wrapped around rollers 806. The MDR provided in each conveyor zones 802, 804 drives the load 903 from one conveyor zone 802 to another conveyor zone 804 and vice-vera. According to an embodiment, the two conveyor zones 802, 804 may include one or more sensors (not shown) to detect a presence of the load 903 on the conveyor zones 802, 804. For example, the MDR of the conveyor zones 802, 804 may be activated to move the load 903 from one conveyor zone 802 to another conveyor zone 804 only after detecting the presence of the load 903.

According to an embodiment, one or more components 819 for controlling the load handling station 704 is attached to a control box 812. As shown in FIG. 8, the control box 812 positioned in between one of the guide tracks 810 and the load handling station 704, however, conceivable are other arrangements in which two control boxes 812 are employed, each positioned on either side of the load handling station 704 and in between the guide tracks 810. According to an embodiment, the control box 812 may include a base frame 816 and a lid 814. The base frame 816 is fastened to the guide track 810 using a mounting bracket 815, for example, a 1' shaped mounting bracket as shown in FIG. 8. The one or more components 819 are attached to the base frame 816 using suitable fasteners known in the art. For example, the one or more components 819 may be control components such as MDR cards for controlling the motorized drive rollers on the conveyor zones. For example, the one or more components 819 may be I/O communication components with M8 or M12 connections to receive cables/wirings of the one or more sensors and the MDR cards. According to an embodiment, the lid 814 and the base frame 816 are coupled to each other using one of hinge joints or pivot pins or mechanical fasteners. In the example, shown in FIG. 8, ends of the lid 814 are coupled to the ends of the base frame 816 using a pin hinge 821. Pins at the ends of the lid 814 are seated on corresponding holes on the base frame 816 to form a hinged connection. According to an embodiment, the lid 814 is pivoted between a closed position and an open position with respect to the base frame 816. For example, the pin hinge 821 forming the hinge connection may facilitate pivotal movement of the lid 814 such that the lid 814 can be closed and opened. According an embodiment, the lid 814 may enclose the one or more components 819 attached to the base frame 816 when the lid 814 is in the closed position. Such a configuration protects the one or more components 819 from wear and tear. According to an embodiment, the lid 814 may be pivoted to the open position when the one or more components 819 require to be accessed for maintenance. According to an embodiment, the base frame 816 may include a pair of wiring holes 817 to route the wirings/cables of the one or more components 819 inside the control box 812. According to an embodiment, the lid 814 is locked with the base frame 816 using a locking mechanism. The locking mechanism, for example, may be a bolt-latch lock, a magnetic lock, a snap fit lock, or any locking mechanism known in the art. In FIG. 8, an example of the snap fit lock is provided in which grooves 823 on the ends of the lid 814 snaps with protrusions 824 provided on the base frame 816. According to an embodiment, the locking mechanism 420 to lock the drop-down plate 302 with the conveyor frame 202 may be used to lock the lid 814 with the base frame 816.

According an embodiment, the control box 812 positioned adjacent the load handling station 704 bridges a gap 830 between the load handling station 704 and the guide track 810. For example, as shown in FIG. 8, the gap 830 between the conveyor zones 802, 804 and the guide track 810 is filled by the installation of the control box 812 in the gap 830. Such a configuration may enable the autonomous vehicle 901 travelling on the guide track 810 to smoothly retrieve or deposit the load 903 from or to the load handling station 704 without being caught in the gap 830. As shown in FIG. 9, the autonomous vehicle 901 travels on the guide track 810 and retrieves the load 903 placed on the second conveyor zone 804 using load handling arms 902 of the autonomous vehicle 901. For example, the autonomous vehicle 901 shown in FIG. 9 is a shuttle vehicle. According to an embodiment, the lid 814 of the control box 812 enables smooth transition of the load 903 between the autonomous vehicle 901 and the load handling station 704 when the lid 814 is in the closed position. For example, the lid 814 may be made of smooth material such as a polished metal or transparent glass to enable the load 903 to slide over the lid 814 at ease when retrieved by the load handling arms 902 of the autonomous vehicle 901. Thus, the lid 814 may be used for protecting the one or more components 819 of the load handling station 704 and for enabling the smooth transition of the load 903 between the load handling station 704 and the autonomous vehicle 901. FIG. 9 shows the autonomous vehicle 901 accessing the load 903 from one side of the load handling station 704 installed with the control box 812, however, other arrangements in which, two control boxes 812, one on each side of the load handling station 704 may be feasible to bridge the gaps 830 between the guide tracks 810 and the load handling station 704 while making provisions for the autonomous vehicle 901 to access the load 903 from both sides of the load handling station 704 without being caught in the gaps 830. Such an arrangement may allow the components 819 to be distributed between the two control boxes 812 facilitating ease of maintenance of the components. Therefore, the control box 812 with the pivotable lid 814 may ensure safety of both the load 903 handled by the load handling station 704 and the components 819 operating the load handling station 704.

The distributed control architecture and control logic for controlling the vertical lifts, the autonomous vehicle, and the load handling station are disclosed in FIGS. 6 and 7 of U.S. Pat. No. 10,611,568 incorporated herein for reference.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The foregoing description of an embodiment has been presented for purposes of illustration and description. It is not intended to be exhaustive or to limit the invention to the precise form disclosed. Obvious modifications or variations are possible in light of the above teachings. The embodiment was chosen and described in order to best illustrate the principles of the invention and its practical application to thereby enable one of ordinary skill in the art to best utilize the invention in various embodiments and with various modifications as are suited to the particular use contemplated. Although only a limited number of embodiments of the invention are explained in detail, it is to be understood that the invention is not limited in its scope to the details of construction and arrangement of components set forth in the preceding description or illustrated in the drawings. The invention is capable of other embodiments and of being practiced or carried out in various ways. Also, in describing the embodiment, specific terminology was used for the sake of clarity. It is to be understood that each specific term includes all technical equivalents which operate in a similar manner to accomplish a similar purpose.

The invention claimed is:

1. A vertical lift comprising:
    a vertical mast;
    a conveyor carriage;
    a lifting unit to guide the conveyor carriage on the vertical mast, wherein the conveyor carriage comprises:
    a conveyor frame comprising a pair of side rails;
    a load carrying portion coupled between the pair of side rails; and
    a pair of drop-down plates hingedly mounted to the conveyor frame and positioned in between the pair of side rails, and wherein the lifting unit comprises:
    at least one spreader to support the conveyor carriage; and
    a set of guide rollers positions on opposing sides of the at least one spreader, wherein the guide rollers guide the conveyor carriage on the vertical mast.

2. The vertical lift of claim 1, wherein each drop-down plate is pivotable between an open position and a closed position, and wherein each drop-down plate encloses one or more components of the conveyor carriage in the closed position.

3. The vertical lift of claim 2, wherein each of the drop-down plate comprises wiring clamps mounted to an inner surface of the drop-down plate to route wiring of the one or more components through wiring holes provided on each side rail, and wherein the wiring is housed in between a top plate and a bottom plate attached to each side rail.

4. The vertical lift of claim 3, wherein the conveyor frame comprises a flared side guide attached to the top plate of each side rail.

5. The vertical lift of claim 2, wherein the drop-down plate further comprises:
    a locking mechanism to lock the drop-down plate with the conveyor frame in the closed position, wherein the locking mechanism comprises spring loaded pins.

6. The vertical lift of claim 5, wherein the pair of drop-down plates comprising:
    a first drop-down plate hingedly mounted to the conveyor frame at an upstream side; and
    a second drop-down plate hingedly mounted to the conveyor frame at a downstream side.

7. The vertical lift of claim 6, wherein the locking mechanism further comprises finger rings, wherein the spring loaded pins and the finger rings are attached to an inner surface of the first drop-down plate.

8. The vertical lift of claim 2, wherein the one or more components are attached on an inner surface of each of the pair of drop-down plates such that the components are accessible in the open position.

9. The vertical lift of claim 5, wherein the drop-down plate is transitioned to the open position from the closed position by retracting the spring loaded pins.

10. The vertical lift of claim 1, wherein each of the side rails comprise a cut-out to facilitate mounting of the conveyor carriage on to at least one spreader.

11. The vertical lift of claim 1, wherein a length of each of the drop-down plate is equal to a distance between the pair of side rails.

12. The vertical lift of claim 1, wherein the conveyor carriage further comprises at least one attachment bracket coupled at a bottom of the conveyor frame in between the pair of side rails beneath the load carrying portion, wherein each drop-down plate and the at least one attachment bracket are coupled together with a hinge mechanism.

13. The vertical lift of claim 12, wherein the hinge mechanism is one a of a spring-hinge or a butt-hinge.

14. The vertical lift of claim 1, wherein the load carrying portion comprises at least one of conveyor rollers or a conveyor belt or a combination thereof.

15. The vertical lift of claim 1, wherein the conveyor carriage further comprises at least one sensor to detect presence of a load on the load carrying portion.

16. A rack storage system comprising:
a plurality of storage levels;
a load handling station positioned at each storage level;
a control box positioned adjacent the load handling station to bridge a gap between the load handling station and a guide track,
a vertical lift comprising:
a vertical mast;
a conveyor carriage;
a lifting unit to guide the conveyor carriage on the vertical mast, wherein the lifting unit comprises:
at least one spreader to support the conveyor carriage; and
a set of guide rollers positions on opposing sides of the at least one spreader, wherein the guide rollers guide the conveyor carriage on the vertical mast.

17. The rack storage system of claim 16, wherein the control box comprises:
a lid coupled to an end of the control box, wherein the lid is pivotable between an open position and a closed position, and wherein the lid encloses one or more components of the load handling station in the closed position.

18. The rack storage system of claim 17, wherein the lid enables smooth transition of loads between an autonomous vehicle travelling on the guide track and the load handling station in the closed position.

19. The rack storage system of claim 18, wherein the load handling station comprises one of conveyor rollers or conveyor belts or a combination thereof to transport the loads for pick up and deposit by the autonomous vehicle.

20. The rack storage system of claim 17, wherein an end of the lid is coupled to the control box using one of hinge joints or pivot pins or mechanical fasteners.

* * * * *